70. LOCKS,
NO PRINTED SPECIFICATION AVAILABLE.
SWAIN
309
A. A. Richards,
Permutation Lock.
No. 246. A.I. Patented Aug. 9, 1859.
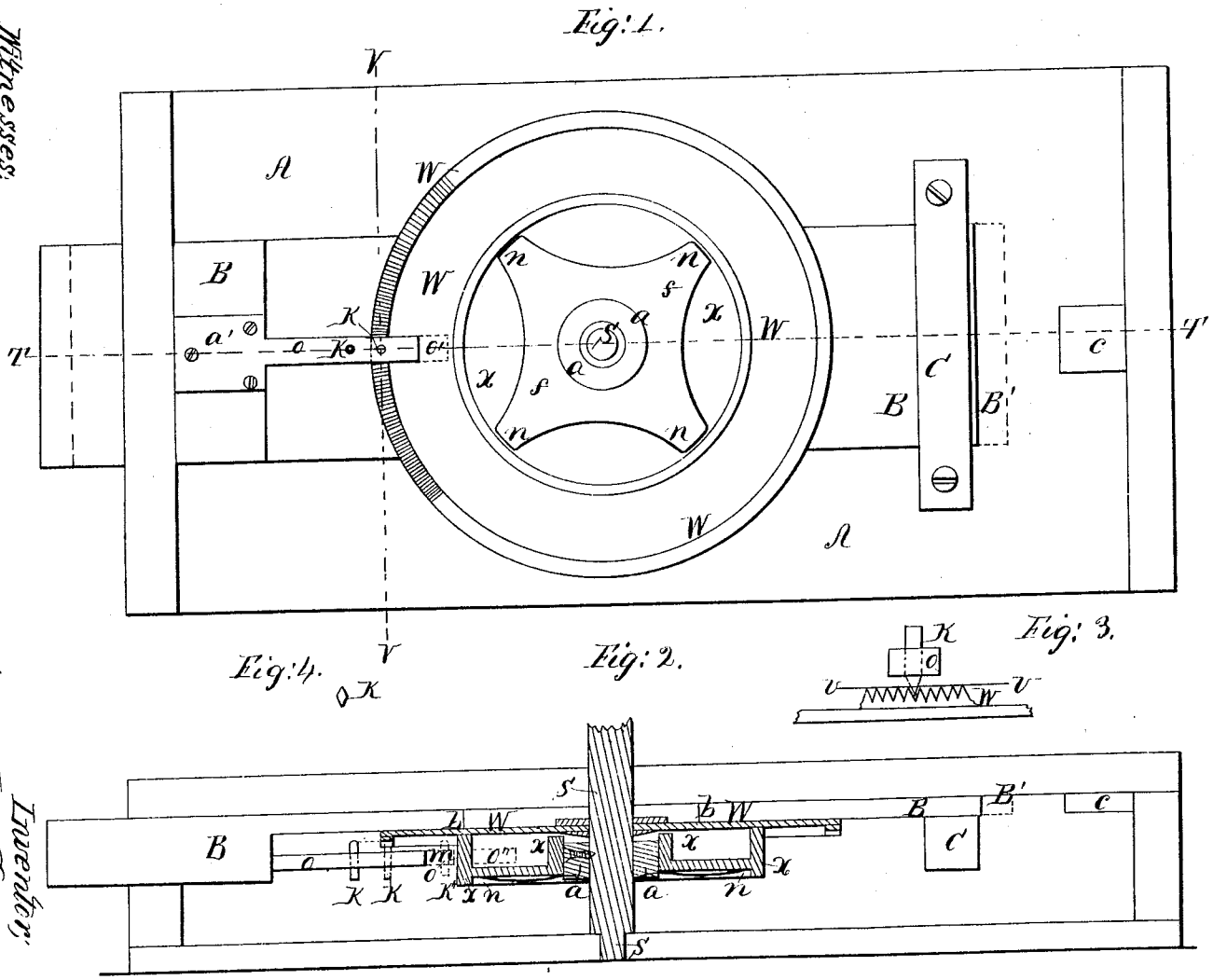
Witnesses,
John H. Sanns jr
N. Rhodes
Inventor,
Amos A. Richards
AM. PHOTO-LITHO. CO. N.Y. (OSBORNE'S PROCESS.)